United States Patent
Karpenman et al.

(10) Patent No.: US 12,429,133 B2
(45) Date of Patent: Sep. 30, 2025

(54) AUTOMATED MECHANICAL TRANSMISSION FOR A VEHICLE

(71) Applicant: VOLVO TRUCK CORPORATION, Gothenburg (SE)

(72) Inventors: Fredrik Karpenman, Västra Frölunda (SE); Magnus Blanckenfiell, Hisings Kärra (SE)

( * ) Notice: Subject to any disclaimer, the term of this patent is extended or adjusted under 35 U.S.C. 154(b) by 10 days.

(21) Appl. No.: 18/047,484

(22) Filed: Oct. 18, 2022

(65) Prior Publication Data

US 2023/0122960 A1    Apr. 20, 2023

(30) Foreign Application Priority Data

Oct. 19, 2021 (EP) .................................. 21203329

(51) Int. Cl.
  *F16H 61/00* (2006.01)
  *F16H 3/091* (2006.01)
  (Continued)

(52) U.S. Cl.
  CPC ....... *F16H 61/0403* (2013.01); *F16H 3/0915* (2013.01); *F16H 3/12* (2013.01);
  (Continued)

(58) Field of Classification Search
  CPC ...... F16H 61/0403; F16H 3/0915; F16H 3/12; F16H 61/70; F16H 2003/123;
  (Continued)

(56) References Cited

U.S. PATENT DOCUMENTS 8,752,442 B2 * 6/2014 Hedman ................... F16H 3/08
                                                                  74/330
8,960,032 B2 * 2/2015 Hedman ................... F16H 3/08
                                                                  74/330
(Continued)

FOREIGN PATENT DOCUMENTS

DE    102016208646 A1    11/2017
DE    102019219959 A1    6/2021
WO    WO-2019072383 A1 *  4/2019    ........... F16D 48/066

OTHER PUBLICATIONS

Extended European Search Report in corresponding European Application No. 21203329.4 dated Feb. 8, 2022 (7 pages).

*Primary Examiner* — Victor L MacArthur
(74) *Attorney, Agent, or Firm* — .Venable LLP; Jeffri A. Kaminski

(57) ABSTRACT

An automated mechanical transmission for a vehicle includes a main gearbox assembly comprising a main shaft and being adapted to be shiftable between at least one engaged state and a neutral state; a split gearbox assembly comprising an input shaft and being adapted to be shiftable between a first engaged state, a second engaged state and a neutral state; a countershaft; a crawler gearbox assembly comprising a crawler gear engagement member which is adapted to selectively engage and disengage a crawler gear defining a torque path from the input shaft to the main gearbox assembly via the countershaft; a gearbox brake; and transmission control unit. The transmission is configured to be settable in an AMT neutral state defined by the main gearbox assembly being in the neutral state. When the transmission control unit obtains a request to engage the crawler gear from the AMT neutral state, the transmission control unit is configured to apply the gearbox brake so that a rotational speed of the countershaft is reduced to a first predetermined rotational speed which is higher than a zero (Continued)

rotational speed; and when the first predetermined rotational speed is reached, release the gearbox brake, set the split gearbox assembly to the neutral state and engage the crawler gear by the crawler gear engagement member.

12 Claims, 3 Drawing Sheets

(51) Int. Cl.
    *F16H 3/12*     (2006.01)
    *F16H 61/04*     (2006.01)
    *F16H 61/70*     (2006.01)

(52) U.S. Cl.
    CPC ....... *F16H 61/70* (2013.01); *F16H 2003/123* (2013.01); *F16H 2061/0411* (2013.01)

(58) Field of Classification Search
    CPC ..... F16H 2061/0411; F16H 2200/0026; F16H 37/046; F16H 2037/045; F16H 61/702; B60Y 2200/14
    See application file for complete search history.

(56) References Cited

U.S. PATENT DOCUMENTS

| | | | |
|---|---|---|---|
| 10,871,212 B2 * | 12/2020 | Dahlbäck | ................ F16H 3/091 |
| 2013/0133450 A1 * | 5/2013 | Hedman | ................... F16H 3/12 |
| | | | 74/330 |
| 2014/0196556 A1 | 7/2014 | Beck et al. | |

* cited by examiner

AUTOMATED MECHANICAL TRANSMISSION FOR A VEHICLE

TECHNICAL FIELD

The invention relates to an automated mechanical transmission (AMT) for a vehicle. The invention also relates to a method for providing a gear shift of an AMT for a vehicle.

The invention can be applied in heavy-duty vehicles, such as trucks, buses and construction equipment. Although the invention will be described with respect to a truck, the invention is not restricted to this particular vehicle, but may also be used in other vehicles such as working machines and passenger cars.

BACKGROUND

Automated mechanical transmissions, AMTs, are often used for heavy duty trucks and other commercial vehicles. An AMT comprises an input shaft which is drivingly connected to an output shaft. The output shaft is in turn drivingly connected to a propeller shaft of the vehicle.

Generally, an AMT may be defined as a mechanical transmission where gear shifts are automatically performed by use of one or more actuators which are controlled by a transmission control unit.

An AMT typically comprises a countershaft which drivingly connects the input shaft to the output shaft.

More particularly, an AMT typically comprises a main gearbox assembly which comprises a main shaft and which is adapted to be shiftable between at least one engaged state and a neutral state. For example, the main gearbox assembly may comprise three or more gearwheels with varying diameters arranged on the main shaft.

The AMT may also comprise a split gearbox assembly which comprises the input shaft and which is adapted to be shiftable between a first engaged state, a second engaged state and a neutral state.

The countershaft typically comprises gearwheels which are in driving connection with the gearwheels of the main gearbox assembly and in driving connection with gearwheels of the split gearbox assembly. Accordingly, the countershaft forms part of the main gearbox assembly and of the split gearbox assembly.

The AMT may for example be designed so that it provides 12 forward gears and 4 reverse gears.

In recent years a new AMT type has been developed which also includes a crawler gear in addition to the regular forward and reverse gears. The crawler gear is a gear which is used when e.g. the vehicle is driving at low speed, such as 0.5 to 2 km/h, e.g. 1 km/h. It is typically used in steep uphills and/or when starting from standstill. Accordingly, the speed ratio between the input shaft and the output shaft is large when the crawler gear is engaged. For example, the speed ratio from the input shaft to the output shaft may be in the range of 15:1 to 35:1, such as 20:1.

Even though the above mentioned AMTs comprising a crawler gear have shown to be very useful for especially heavy-duty vehicles, there is still a strive to develop further improved AMTs with a crawler gear.

SUMMARY

In view of the above, an object of the invention is to provide an improved automated mechanical transmission for a vehicle. In particular, an object of the invention is to provide an AMT in which the engagement of the crawler gear is improved. Further objects of the invention are to provide an improved method for providing a gear shift of an automated mechanical transmission, and an improved vehicle.

Thus, there is provided an automated mechanical transmission for a vehicle, comprising:
- a main gearbox assembly comprising a main shaft and being adapted to be shiftable between at least one engaged state and a neutral state;
- a split gearbox assembly comprising an input shaft and being adapted to be shiftable between a first engaged state, a second engaged state and a neutral state;
- a countershaft;
- a crawler gearbox assembly comprising a crawler gear engagement member which is adapted to selectively engage and disengage a crawler gear defining a torque path from the input shaft to the main gearbox assembly via the countershaft;
- a gearbox brake; and
- a transmission control unit.

The transmission is configured to be settable in an AMT neutral state defined by the main gearbox assembly being in the neutral state, the split gearbox assembly being in one of the engaged states and the input shaft being in driving connection with a power unit causing the input shaft to rotate when the transmission is in use.

When the transmission control unit obtains a request to engage the crawler gear from the AMT neutral state, the transmission control unit is configured to:
- apply the gearbox brake so that a rotational speed of the countershaft is reduced to a first predetermined rotational speed which is higher than a zero rotational speed; and
- when the first predetermined rotational speed is reached, release the gearbox brake, set the split gearbox assembly to the neutral state and engage the crawler gear by the crawler gear engagement member.

By the provision of the AMT as disclosed herein, an improved AMT is achieved in which the engagement of the crawler gear will be improved. More particularly, by engaging the crawler gear when the first predetermined rotational speed is reached, unwanted noise and/or jerk will be kept at a minimum, or even be eliminated. The present invention is based on a realization that engagement of a crawler gear in an AMT previously resulted in disturbing noise and/or jerk. To this end, the engagement of the crawler gear has been initiated when the countershaft and the input shaft were not rotating, i.e. at zero rotational speed. As such, when the crawler gear was to be engaged, tooth-to-tooth contact commonly appeared in the crawler gearbox assembly. To resolve this issue, a clutch between the input shaft and the power unit was temporarily engaged for a short time period to introduce jerk into the transmission, and thereby the crawler gear could be engaged. In view of the above, the present invention is based on an insight to engage the crawler gear before the countershaft is completely stopped, and also to engage the crawler gear at a predetermined speed, i.e. when the predetermined rotational speed has been reached. Thereby, unwanted noise and/or jerk can be reduced or even eliminated.

A "crawler gear" may be defined as a gear of the transmission which provides a larger input/output speed ratio than any one of the other selectable gears of the transmission. By way of example, the crawler gearbox assembly may be provided as a separate extension of an otherwise standard AMT. The separate extension may be provided upstream the main gearbox assembly and the split gearbox assembly, as seen in a torque path from the power unit to a propeller shaft of the vehicle, when the transmission is used therein.

The AMT may be connected to different kinds of power units, including but not limited to an internal combustion engine and one or more electric motors.

For example, when the input shaft is connectable to e.g. an internal combustion engine, the AMT may further comprise a clutch member for drivingly connecting and disconnecting the input shaft between a connected state and a disconnected state with respect to the power unit. The clutch member is in the connected state when the AMT is in the AMT neutral state. Thereby, the power unit will cause the input shaft to rotate when the transmission is in use. As such, when the transmission control unit obtains the request to engage the crawler gear from the AMT neutral state, the transmission control unit may further be configured to:

disconnect the clutch member to the disconnected state.

Alternatively, when e.g. the power unit is one or more electric motors, no clutch member may be provided between the power unit and the input shaft. In other words, the connection between the power unit and the input shaft may be a permanent driving connection, i.e. a connection which is free from any disconnection means for disconnecting the driving connection. Thereby, by way of example, the power unit may work as the gearbox brake.

Alternatively, the gearbox brake may be a brake which is associated with the countershaft, i.e. the transmission may be braked by applying a braking force to the countershaft. Of course, the gearbox brake may in addition or alternatively be configured to be associated with the input shaft and/or the main shaft.

Optionally, the transmission control unit may further be configured to:

reapply the gearbox brake so that the rotational speed of the countershaft is further reduced to a second predetermined rotational speed, and when the second rotational speed is reached, set the main gearbox assembly to one of the at least one engaged state.

The second predetermined rotational speed, which accordingly is a lower speed than the first predetermined rotational speed, is preferably also not a zero speed. Thereby, the main gearbox assembly can be set to the at least one engaged state when the shafts are in rotation, which also implies reduced noise and/or jerk.

Preferably, the first predetermined rotational speed may correspond to a predetermined differential rotational speed between the input shaft and the countershaft. It has further been realized that in order to reduce unwanted noise and/or jerk, the first predetermined speed should be set based on a suitable differential rotational speed between the input shaft and the countershaft. For example, it has been realized that a suitable differential rotational speed may be in the range of 40-120 rpm, such as 60-100 rpm, for example 70-90 rpm.

Optionally, the first predetermined rotational speed may be set by taking retardation during the shifting operations of at least one of the split gearbox assembly and the crawler gearbox assembly into consideration. By taking retardation during the shifting operations into consideration, a more optimum speed for the crawler gear engagement may be achieved, implying further reduced noise and/or jerk. For example, taking retardation during the shifting operations of at least one of the split gearbox assembly and the crawler gearbox assembly into consideration may comprise to set the first predetermined rotational speed to a rotational speed which is higher than an actual optimal rotational speed so that the crawler gear is engaged when the actual optimal rotational speed is reached. For example, the first predetermined rotational speed may be set to a rotational speed which is 5-60%, such as 10-60%, higher than an actual optimal speed so that the crawler gear is engaged when the actual optimal rotational speed is reached. Purely by way of example, the first predetermined rotational speed may be set to a higher value than a value corresponding to the above mentioned predetermined differential rotational speed.

Optionally, the first predetermined rotational speed may be adapted to vary in relation to varying retardation effects caused by varying ambient conditions, such as varying transmission oil temperature. Thereby, noise and/or jerk may be further reduced. For example, the first predetermined rotational speed may be adapted to cold conditions and/or warm conditions, resulting in different optimal speeds for the crawler gear engagement.

Optionally, the crawler gear of the crawler gearbox assembly may be configured to provide a speed ratio of the input shaft with respect to the countershaft in the range of 1.5/1 to 5/1, such as 2/1 to 5/1, for example substantially 3/1.

Optionally, the split gearbox assembly may further comprise a first input shaft gearwheel arranged on the input shaft, a first main gearwheel arranged on the main shaft and a split gearbox engagement member adapted to shift the split gearbox assembly between the two engaged states and the neutral state, wherein in the first engaged state, the split gearbox engagement member rotationally connects the first input shaft gearwheel with the input shaft, in the second engaged state, the split gearbox engagement member rotationally connects the first main gearwheel with the input shaft and, in the neutral state, the split gearbox engagement member is provided in a neutral state in which each one of the first input shaft gearwheel and the first main gearwheel is rotationally free with respect to the input shaft.

Optionally, the main gearbox assembly may further comprise a first main gearbox engagement member which is adapted to shift the main gearbox assembly to an engaged state where the first main gearbox engagement member rotationally connects the first main gearwheel with the main shaft.

Optionally, the transmission may further comprise a first and second countershaft gearwheels arranged on the countershaft, wherein the first countershaft gearwheel is arranged in driving connection with the first input shaft gearwheel and the second countershaft gearwheel is arranged in driving connection with the first main gearwheel. Preferably, the first countershaft gearwheel is arranged in meshing engagement with the first input shaft gearwheel and/or the second countershaft gearwheel is arranged in meshing engagement with the first main gearwheel.

Optionally, the crawler gearbox assembly may comprise a first crawler gearwheel arranged on the input shaft and a second crawler gearwheel arranged on the countershaft and being in driving connection with the first crawler gearwheel. Preferably, the first crawler gearwheel is arranged in meshing engagement with the second crawler gearwheel.

Optionally, the first crawler gearwheel may be rotationally fixed to or integrated with the input shaft. This may result in fewer parts of the transmission, implying a cost-effective configuration.

Optionally, the transmission may comprise a third countershaft gearwheel arranged on the countershaft and wherein the main gearbox assembly comprises a second main gearwheel arranged on the main shaft, wherein the second main gearwheel is drivingly connected to the third countershaft gearwheel and wherein the main gearbox assembly is arranged to be shiftable between a second main gearwheel engaged state where the second main gearwheel is rotationally connected to the main shaft and a second main gearwheel disengaged state where the second main gearwheel is rotationally free with respect to the main shaft.

Optionally, the transmission may comprise a fourth countershaft gearwheel arranged on the countershaft and wherein the main gearbox assembly comprises a third main gearwheel arranged on the main shaft, wherein the third main gearwheel is drivingly connected to the fourth countershaft gearwheel and wherein the main gearbox assembly is arranged to be shiftable between a third main gearwheel engaged state where the third main gearwheel is rotationally connected to the main shaft and a third main gearwheel disengaged state where the third main gearwheel is rotationally free with respect to the main shaft.

Optionally, the transmission may comprise a fifth countershaft gearwheel arranged on the countershaft and wherein the main gearbox assembly comprises a fourth main gearwheel arranged on the main shaft, wherein the fourth main gearwheel is drivingly connected to the fifth countershaft gearwheel so that a rotation of the fifth countershaft gearwheel results in a reversed rotation of the fourth main gearwheel, and wherein the main gearbox assembly is arranged to be shiftable between a fourth main gearwheel engaged state where the fourth main gearwheel is rotationally connected to the main shaft and a fourth main gearwheel disengaged state where the fourth main gearwheel is rotationally free with respect to the main shaft.

Thus, there is provided a method for providing a gear shift of an automated mechanical transmission for a vehicle.

The transmission comprises:
a main gearbox assembly comprising a main shaft and being adapted to be shiftable between at least one engaged state and a neutral state,
a split gearbox assembly comprising an input shaft and being adapted to be shiftable between a first engaged state, a second engaged state and a neutral state;
a countershaft,
a crawler gearbox assembly comprising a crawler gear engagement member which is adapted to selectively engage and disengage a crawler gear defining a torque path from the input shaft to the main gearbox assembly via the countershaft;
a gearbox brake;
wherein the transmission is configured to be settable in an AMT neutral state defined by the main gearbox assembly being in the neutral state, the split gearbox assembly being in one of the engaged states and the input shaft being in driving connection with a power unit causing the input shaft to rotate when the transmission is in use.

The method comprises:
when obtaining a request to engage the crawler gear from the AMT neutral state:
applying the gearbox brake so that a rotational speed of the countershaft is reduced to a first predetermined rotational speed which is higher than a zero rotational speed; and
when the first predetermined rotational speed is reached, releasing the gearbox brake, setting the split gearbox assembly to the neutral state and engaging the crawler gear by the crawler gear engagement member.

Advantages and effects of the second aspect of the invention are largely analogous to advantages and effects of the first aspect of the invention. It shall also be noted that all embodiments of the first aspect of the invention are applicable to all embodiments of the second aspect of the invention, and vice versa.

Optionally, the method may further comprise:
reapplying the gearbox brake so that the rotational speed of the countershaft is further reduced to a second predetermined rotational speed, and
when the second rotational speed is reached, setting the main gearbox assembly to one of the at least one engaged state.

Embodiments of the method are preferably performed by use of a transmission control unit as disclosed herein.

As such, the disclosure also relates to a computer program comprising program code means for performing the method of any of the embodiments disclosed herein when said program is run on a computer, such as on the transmission control unit. Furthermore, the disclosure also relates to a computer readable medium carrying a computer program comprising program code means for performing the method of the embodiments disclosed herein when said program product is run on a computer, such as on transmission control unit.

Thus, there is provided a vehicle comprising the automated mechanical transmission according to any one of the embodiments of the first aspect of the invention.

The vehicle may be any type of vehicle, such as a heavy-duty truck, a working machine or a bus.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
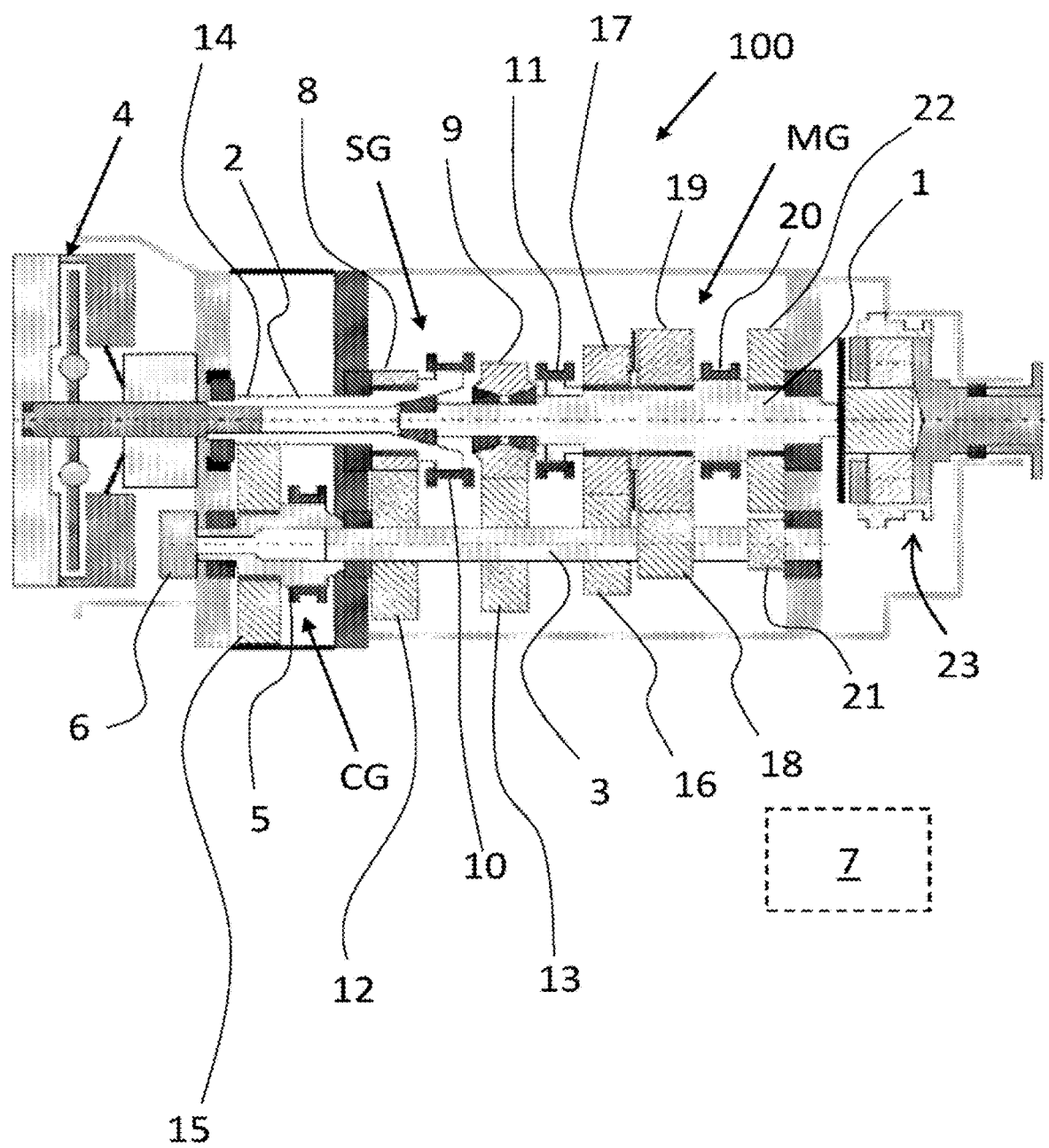
FIG. 1 is a schematic view of an automated mechanical transmission according to an example embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 2:
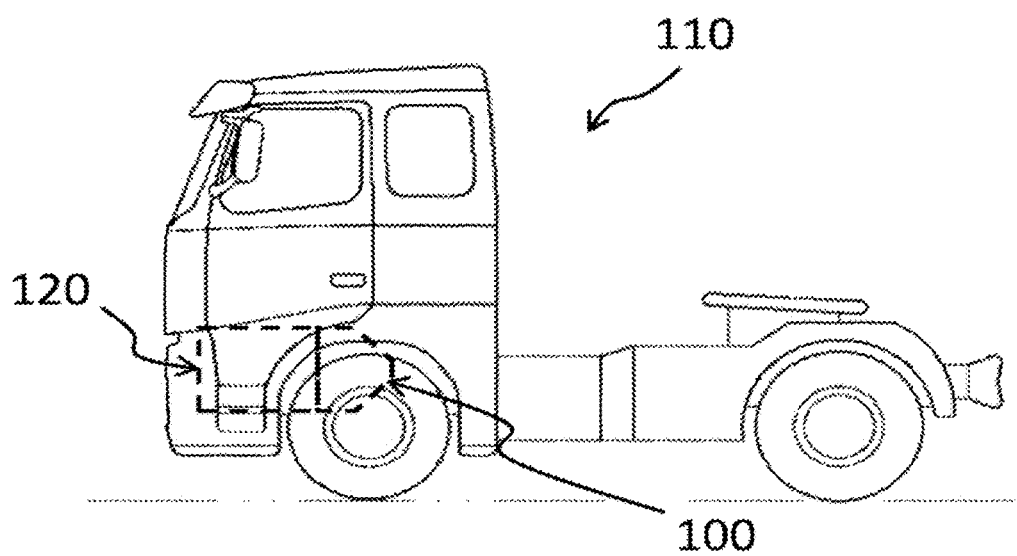
FIG. 2 is a side view of a vehicle according to an example embodiment of the invention.

FIG. 1 depicts an automated mechanical transmission, AMT, 100 according to an example embodiment of the present invention. The AMT 100 may be provided in a vehicle, such as in the vehicle 110 shown in FIG. 2. The vehicle 110 in FIG. 2 is a heavy-duty truck. However, it shall be noted that the AMT 100 could also be used in other vehicles, such as in other types of trucks, working machines and buses. The vehicle 110 further comprises a power unit 120 which is drivingly connected or connectable to the AMT 100. The power unit 120 may for example be an internal combustion engine and/or an electric motor. The AMT 100 is in turn drivingly connected or connectable to a propeller shaft (not shown). The propeller shaft is drivingly connected or connectable to one or more driving wheels of the vehicle 110, such as drivingly connected via a differential gear (not shown).

The AMT 100 comprises:
- a main gearbox assembly MG comprising a main shaft 1 and being adapted to be shiftable between at least one engaged state and a neutral state;
- a split gearbox assembly SG comprising an input shaft 2 and being adapted to be shiftable between a first engaged state, a second engaged state and a neutral state;
- a countershaft 3;
- a crawler gearbox assembly CG comprising a crawler gear engagement member 5 which is adapted to selectively engage and disengage a crawler gear defining a torque path from the input shaft 2 to the main gearbox assembly MG via the countershaft 3;
- a gearbox brake 6; and
- a transmission control unit 7.

As shown, the AMT 100 may also comprise a clutch member 4 for drivingly connecting and disconnecting the input shaft 2 between a connected state and a disconnected state with respect to the power unit 110 as e.g. shown in FIG. 2.

The AMT 100 is configured to be settable in an AMT neutral state defined by the main gearbox assembly MG being in the neutral state, the split gearbox assembly SG being in one of the engaged states and the input shaft 2 being in driving connection with a power unit 110 causing the input shaft 2 to rotate when the transmission is in use. In the shown embodiment, the clutch member 4 is in the connected state when the AMT 100 is in the AMT neutral state.

When the transmission control unit 7 obtains a request to engage the crawler gear from the AMT neutral state, the transmission control unit 7 is configured to:
- disconnect the clutch member 4 to the disconnected state,
- apply the gearbox brake 6 so that a rotational speed of the countershaft 3 is reduced to a first predetermined rotational speed which is higher than a zero rotational speed; and
- when the first predetermined rotational speed is reached, release the gearbox brake 6, set the split gearbox assembly SG to the neutral state and engage the crawler gear by the crawler gear engagement member 5.

The power unit 120 in FIG. 2 is an internal combustion engine. However, as mentioned in the above, it may e.g. additionally or alternatively be one or more electric motors. When one or more electrical motors are used, the clutch member 4 may be omitted, and the braking may be performed by use of the one or more electric motors instead of the gearbox brake 6 as shown in FIG. 1. The gearbox brake 6 may as shown be connected to the countershaft 3 for braking the countershaft 3.

The transmission control unit 7 as shown in FIG. 1 may further be configured to:
- reapply the gearbox brake 6 so that the rotational speed of the countershaft 3 is further reduced to a second predetermined rotational speed, and
- when the second rotational speed is reached, set the main gearbox assembly MG to one of the at least one engaged state.

The first predetermined rotational speed may correspond to a predetermined differential rotational speed between the input shaft 2 and the countershaft 3. For example, the predetermined differential rotational speed may be in the range of 40-120 rpm, such as 60-100 rpm, for example 70-90 rpm.

The first predetermined rotational speed may be set by taking retardation during the shifting operations of at least one of the split gearbox assembly SG and the crawler gearbox assembly CG into consideration.

The first predetermined rotational speed may be adapted to vary in relation to varying retardation effects caused by varying ambient conditions, such as varying transmission oil temperature. Accordingly, the AMT 100 may further comprise at least one sensor (not shown) which is adapted to measure a temperature indicative of the transmission oil temperature. The at least one sensor is in communicative contact with the transmission control unit.

Furthermore, the crawler gear of the crawler gearbox assembly CG may be configured to provide a speed ratio of the input shaft 2 with respect to the countershaft 3 in the range of 1.5/1 to 5/1, such as 2/1 to 5/1, for example substantially 3/1.

In the shown embodiment, the input shaft 2 and the main shaft 1 are aligned and the countershaft 3 is arranged parallel with respect to the input shaft 2 and the main shaft 1. In addition, as shown, the AMT 100 may further comprise a range gear 23. The range gear 23 may as shown be drivingly connected to the main shaft 1 and provided downstream the main shaft 1, as seen with respect to a torque path of the AMT 100 from the power unit 110 to the propeller shaft. The range gear 23 is arranged to selectively shift the AMT 100 between a low range gear and a high range gear.

The split gearbox assembly SG may as shown comprise a first input shaft gearwheel 8 arranged on the input shaft 2, a first main gearwheel 9 arranged on the main shaft 1 and a split gearbox engagement member 10 adapted to shift the split gearbox assembly SG between the two engaged states and the neutral state. In the first engaged state, the split gearbox engagement member 10 rotationally connects the first input shaft gearwheel 8 with the input shaft 2, in the second engaged state, the split gearbox engagement member 10 rotationally connects the first main gearwheel 9 with the input shaft 2 and, in the neutral state, the split gearbox engagement member 10 is provided in a neutral state in which each one of the first input shaft gearwheel 8 and the first main gearwheel 9 is rotationally free with respect to the input shaft 2.

The main gearbox assembly MG may as shown further comprise a first main gearbox engagement member 11 which is adapted to shift the main gearbox assembly MG to an engaged state where the first main gearbox engagement member 11 rotationally connects the first main gearwheel 9 with the main shaft 1.

The AMT 100 may as shown further comprise first and second countershaft gearwheels 12, 13 arranged on the countershaft 3, wherein the first countershaft gearwheel 12 is arranged in driving connection with the first input shaft gearwheel 8 and the second countershaft gearwheel 13 is arranged in driving connection with the first main gearwheel 9. In the shown embodiment, the first countershaft gearwheel 12 is arranged in meshing engagement with the first input shaft gearwheel 8 and the second countershaft gearwheel 13 is arranged in meshing engagement with the first main gearwheel 9.

Furthermore, as shown, the first and second countershaft gearwheels 12, 13 may be arranged rotationally fixed with respect to the countershaft 3.

The crawler gearbox assembly CG may as shown comprise a first crawler gearwheel 14 arranged on the input shaft 2 and a second crawler gearwheel 15 arranged on the countershaft 3. The second crawler gearwheel 15 is arranged in driving connection with the first crawler gearwheel 14. Accordingly, the crawler gear is engaged when the crawler gear engagement member 5 rotationally connects the second crawler gearwheel 15 to the countershaft 3. In the shown embodiment, the second crawler gearwheel 15 is arranged in meshing engagement with the first crawler gearwheel 14.

As shown, the first crawler gearwheel 14 may be integrated with the input shaft 2.

The AMT 100 may as shown comprise a third countershaft gearwheel 16 arranged on the countershaft 3, wherein the main gearbox assembly MG comprises a second main gearwheel 17 arranged on the main shaft 1. The second main gearwheel 17 is drivingly connected to the third countershaft gearwheel 16 and the main gearbox assembly MG is arranged to be shiftable between a second main gearwheel engaged state where the second main gearwheel 17 is rotationally connected to the main shaft 1 and a second main gearwheel disengaged state where the second main gearwheel 17 is rotationally free with respect to the main shaft 1. The second main gearwheel engaged state and disengaged state may as shown be provided by use of the first main gearbox engagement member 11. In the shown embodiment, the second main gearwheel 17 is arranged in meshing engagement with the third countershaft gearwheel 16.

The AMT 100 may as shown comprise a fourth countershaft gearwheel 18 arranged on the countershaft 3 and wherein the main gearbox assembly MG comprises a third main gearwheel 19 arranged on the main shaft 1. The third main gearwheel 19 is drivingly connected to the fourth countershaft gearwheel 18 and the main gearbox assembly MG is arranged to be shiftable between a third main gearwheel engaged state where the third main gearwheel 19 is rotationally connected to the main shaft 1 and a third main gearwheel disengaged state where the third main gearwheel 19 is rotationally free with respect to the main shaft 1. These states are provided by use of a second main gearbox engagement member 20. In the shown embodiment, the third main gearwheel 19 is arranged in meshing engagement with the fourth countershaft gearwheel 18.

The AMT 100 may also as shown comprise a fifth countershaft gearwheel 21 arranged on the countershaft 3 and wherein the main gearbox assembly MG comprises a fourth main gearwheel 22 arranged on the main shaft 1. The fourth main gearwheel 22 is drivingly connected to the fifth countershaft gearwheel 21 so that a rotation of the fifth countershaft gearwheel 21 results in a reversed rotation of the fourth main gearwheel 22. The main gearbox assembly MG is arranged to be shiftable between a fourth main gearwheel engaged state where the fourth main gearwheel 22 is rotationally connected to the main shaft 1 and a fourth main gearwheel disengaged state where the fourth main gearwheel 22 is rotationally free with respect to the main shaft 1. Accordingly, at least one reverse gear is thereby provided. These states are as shown also provided by use of the second main gearbox engagement member 20.

The engagement members 5, 10, 11 and 20 as disclosed herein may be sleeve-formed members which are connected to e.g. shift forks. The shift-forks may be actuated by one or more actuators (not shown) which are controlled by the transmission control unit 7.

Figure 3:
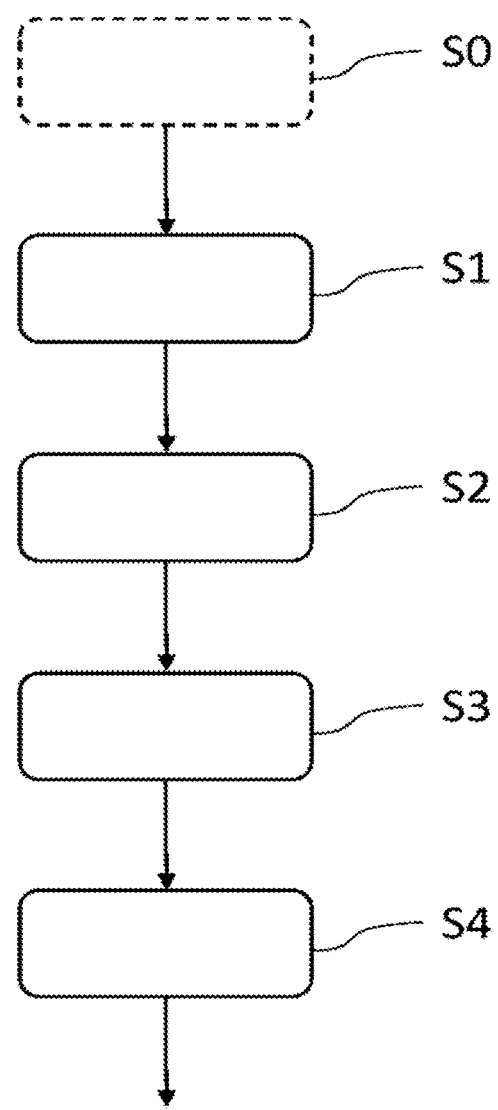
FIG. 3 is a flowchart of a method according to an example embodiment of the invention.
Figure 4:
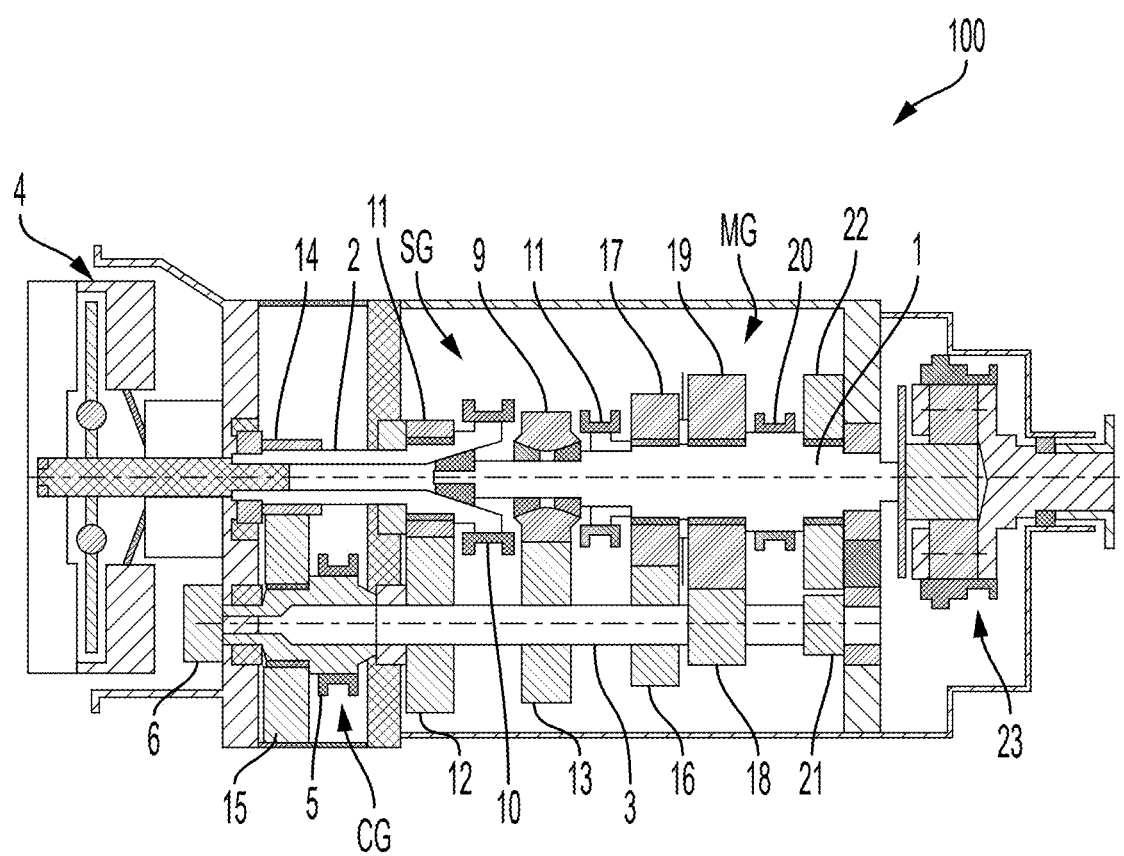

FIG. 3 depicts a flowchart of a method according to an embodiment of the invention. A box with dashed lines indicates that it is an optional step. The method is a method for providing a gear shift of an AMT 100 for a vehicle 110, such as the AMT 100 and the vehicle 110 as shown in FIGS. 1 and 2, respectively.

The method comprises:
when obtaining a request to engage the crawler gear from the AMT neutral state:
S1) applying the gearbox brake 6 so that a rotational speed of the countershaft 3 is reduced to a first predetermined rotational speed which is higher than a zero rotational speed; and
when the first predetermined rotational speed is reached:
S2) releasing the gearbox brake 6,
S3) setting the split gearbox assembly SG to the neutral state, and
S4) engaging the crawler gear by the crawler gear engagement member 5.

The steps S2-S4 are preferably performed simultaneously, or at least substantially simultaneously with respect to each other. Accordingly, the order of the steps may be different to what is shown in FIG. 3.

In an alternative embodiment, and in particular for the AMT 100 shown in FIG. 1, the method comprises:
S0) disconnecting the clutch member 4 to the disconnected state,
S1) applying the gearbox brake 6 so that a rotational speed of the countershaft 3 is reduced to a first predetermined rotational speed which is higher than a zero rotational speed; and
when the first predetermined rotational speed is reached:
S2) releasing the gearbox brake 6, S3) setting the split gearbox assembly SG to the neutral state and S4) engaging the crawler gear by the crawler gear engagement member 5.

Optionally, the method may further comprise:
reapplying the gearbox brake 6 so that the rotational speed of the countershaft 3 is further reduced to a second predetermined rotational speed, and
when the second rotational speed is reached, setting the main gearbox assembly MG to one of the at least one engaged state.

Embodiments of the method are preferably performed by use of the transmission control unit 7 as shown in FIG. 1.

It is to be understood that the present invention is not limited to the embodiments described above and illustrated in the drawings; rather, the skilled person will recognize that many changes and modifications may be made within the scope of the appended claims.

The invention claimed is:

1. An automated mechanical transmission for a vehicle, comprising:
a main gearbox assembly comprising a main shaft and being adapted to be shiftable between at least one engaged state and a neutral state;
a split gearbox assembly comprising an input shaft and being adapted to be shiftable between a first engaged state, a second engaged state and a neutral state;
a countershaft;
a crawler gearbox assembly comprising a crawler gear engagement member which is adapted to selectively engage and disengage a crawler gear defining a torque path from the input shaft to the main gearbox assembly via the countershaft, wherein the crawler gear of the crawler gearbox assembly is configured to provide a speed ratio of the input shaft with respect to the countershaft in the range of 1.5/1 to 5/1, wherein the crawler gearbox assembly comprises a first crawler gearwheel arranged on the input shaft and a second crawler gearwheel arranged on the countershaft and being in driving connection with the first crawler gearwheel, and wherein the crawler gear is engaged when the crawler gear engagement member rotationally connects the second crawler gearwheel to the countershaft;

a gearbox brake; and a transmission control unit;

wherein the transmission is configured to be settable in an AMT neutral state defined by the main gearbox assembly being in the neutral state, the split gearbox assembly being in one of the engaged states and the input shaft being in driving connection with a power unit causing the input shaft to rotate when the transmission is in use; wherein, when the transmission control unit obtains a request to engage the crawler gear from the AMT neutral state, the transmission control unit is configured to:

apply the gearbox brake so that a rotational speed of the countershaft is reduced to a first predetermined rotational speed which is higher than a zero rotational speed; and when the first predetermined rotational speed is reached, release the gearbox brake, set the split gearbox assembly to the neutral state and engage the crawler gear by the crawler gear engagement member.

2. The automated mechanical transmission according to claim 1, wherein the transmission control unit is further configured to:

reapply the gearbox brake so that the rotational speed of the countershaft is further reduced to a second predetermined rotational speed, and when the second rotational speed is reached, set the main gearbox assembly to one of the at least one engaged state.

3. The automated mechanical transmission according to claim 1, wherein the first predetermined rotational speed corresponds to a predetermined differential rotational speed between the input shaft and the countershaft.

4. The automated mechanical transmission according to claim 3, wherein the predetermined differential rotational speed is in the range of 40-120 rpm.

5. The automated mechanical transmission according to claim 1, wherein the split gearbox assembly further comprises a first input shaft gearwheel arranged on the input shaft, a first main gearwheel arranged on the main shaft and a split gearbox engagement member adapted to shift the split gearbox assembly between the two engaged states and the neutral state, wherein in the first engaged state, the split gearbox engagement member rotationally connects the first input shaft gearwheel with the input shaft, in the second engaged state, the split gearbox engagement member rotationally connects the first main gearwheel with the input shaft and, in the neutral state, the split gearbox engagement member is provided in a neutral state in which each one of the first input shaft gearwheel and the first main gearwheel is rotationally free with respect to the input shaft.

6. The automated mechanical transmission according to claim 5, wherein the main gearbox assembly further comprises a first main gearbox engagement member which is adapted to shift the main gearbox assembly to an engaged state where the first main gearbox engagement member rotationally connects the first main gearwheel with the main shaft.

7. The automated mechanical transmission according to claim 5, further comprising a first and second countershaft gearwheels arranged on the countershaft, wherein the first countershaft gearwheel is arranged in driving connection with the first input shaft gearwheel and the second countershaft gearwheel is arranged in driving connection with the first main gearwheel.

8. The automated mechanical transmission according to claim 1, wherein the crawler gearbox assembly comprises a first crawler gearwheel arranged on the input shaft and a second crawler gearwheel arranged on the countershaft and being in driving connection with the first crawler gearwheel.

9. The automated mechanical transmission according to claim 8, wherein the first crawler gearwheel is rotationally fixed to or integrated with the input shaft.

10. The automated mechanical transmission according to claim 1, comprising a third countershaft gearwheel arranged on the countershaft and wherein the main gearbox assembly comprises a second main gearwheel arranged on the main shaft, wherein the second main gearwheel is drivingly connected to the third countershaft gearwheel and wherein the main gearbox assembly is arranged to be shiftable between a second main gearwheel engaged state where the second main gearwheel is rotationally connected to the main shaft and a second main gearwheel disengaged state where the second main gearwheel is rotationally free with respect to the main shaft.

11. A method for providing a gear shift of an automated mechanical transmission for a vehicle, wherein the transmission comprises:

a main gearbox assembly comprising a main shaft and being adapted to be shiftable between at least one engaged state and a neutral state, a split gearbox assembly comprising an input shaft and being adapted to be shiftable between a first engaged state, a second engaged state and a neutral state;

a countershaft, a crawler gearbox assembly comprising a crawler gear engagement member which is adapted to selectively engage and disengage a crawler gear defining a torque path from the input shaft to the main gearbox assembly via the countershaft, wherein the crawler gearbox assembly comprises a first crawler gearwheel arranged on the input shaft and a second crawler gearwheel arranged on the countershaft and being in driving connection with the first crawler gearwheel, and wherein the crawler gear is engaged when the crawler gear engagement member rotationally connects the second crawler gearwheel to the countershaft;

a gearbox brake;

wherein the transmission is configured to be settable in an AMT neutral state defined by the main gearbox assembly being in the neutral state, the split gearbox assembly being in one of the engaged states and the input shaft being in driving connection with the power unit causing the input shaft to rotate when the transmission is in use; wherein the method comprises:

when obtaining a request to engage the crawler gear from the AMT neutral state:

applying the gearbox brake so that a rotational speed of the countershaft is reduced to a first predetermined rotational speed which is higher than a zero rotational speed; and when the first predetermined rotational speed is reached, releasing the gearbox brake, setting the split gearbox assembly to the neutral state and engaging the crawler gear by the crawler gear engagement member.

12. A vehicle comprising the automated mechanical transmission (AMT) according to claim 1.

* * * * *